Patented Jan. 30, 1951

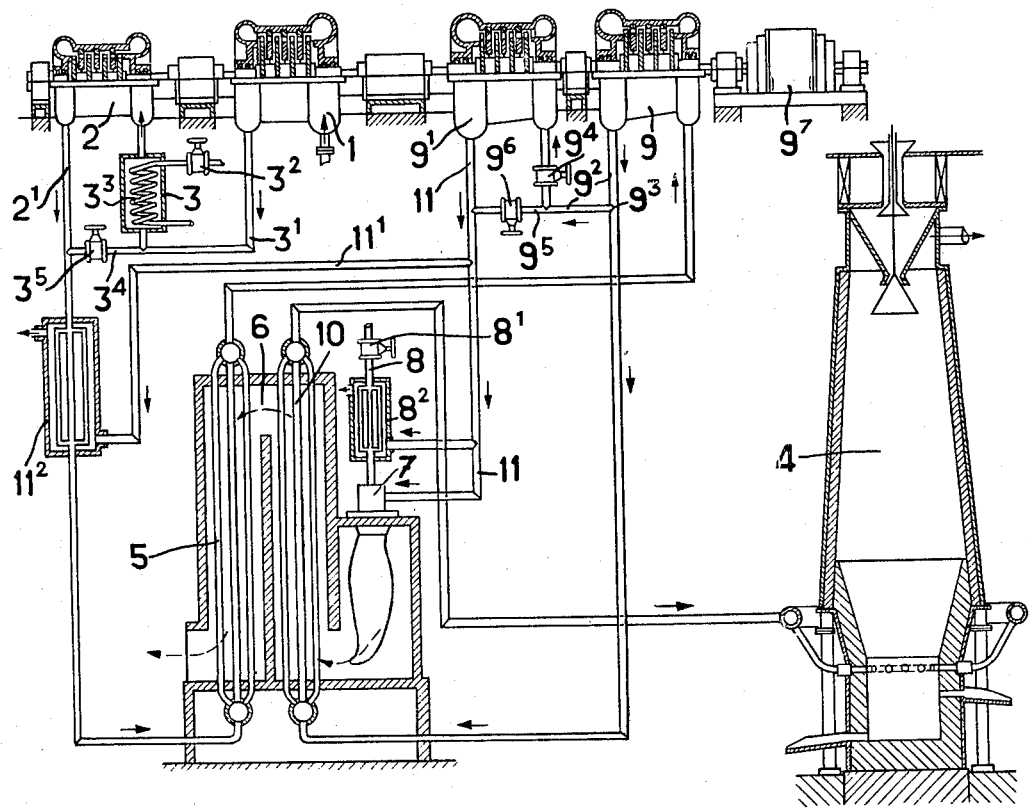

2,539,744

UNITED STATES PATENT OFFICE 2,539,744

PLANT FOR THE PRODUCTION OF COMPRESSED AIR

Curt Keller, Kusnacht, Switzerland, assignor to Aktiengesellschaft Fuer Technische Studien, Zurich, Switzerland, a corporation of Switzerland Application August 8, 1945, Serial No. 609,679
In Switzerland August 12, 1944

4 Claims. (Cl. 263—19)

This invention relates to a plant for the production of compressed air, for example blast furnace air, in which air is brought in at least one compressor to a higher pressure than that corresponding to the pressure at which it is to be used, then heated in a heater by an indirect supply of heat derived from an external source and hereupon expanded whilst giving up energy in at least one turbine which drives the compressor. The object of the invention is to provide a plant of this kind in which the consumption of energy and of heat per normal cubic metre of compressed air is small and which realizes by simple combustional means an economical improvement in comparison with hitherto existing plants.

The invention bases on the fact that a comparatively large amount of heat is still contained in the exhaust air of the turbine. Now, the efficiency of plants of the type in question is higher, the higher the degree to which it is possible to utilize the heat content of the exhaust air of the plant without it being necessary to provide, for example, heat exchangers of large dimensions. For this purpose in a plant according to the present invention a portion of the quantity of air drawn in by the compressor is branched off in any case not later than before the last stage of the turbine and is delivered to a consumer of compressed air, while the remaining portion of said quantity of air, after having passed through the turbine, enters the heater, at least partially, as air for combustion purposes.

The accompanying drawing illustrates by way of example and in a simplified form of representation a preferred arrangement according to this invention. In this drawing the figure shows a plant in which the compressed air required in a blast furnace is branched off from a pipe connecting the two casings of a two-casing air turbine.

Referring to the drawing, the numerals 1 and 2 indicate the casings of a two-casing compressor which draws in air from the atmosphere. This air, which is cooled between the two casings 1, 2 in a cooler 3, is compressed above the pressure which is required in a consumer of compressed air which, in the example shown, is a blast furnace 4. The reference $3^1$ denotes a pipe connecting the two casings of the compressor 1, 2. The air compressed by the compressor 1, 2 passes first into a heating system 5 of a heater 6, to which external heat, derived for example from the combustion of blast furnace gas, is supplied in an indirect manner. The numeral 7 denotes a burner of the heater 6 to which fuel is supplied through a pipe 8. The air heated in the heating system 5 passes into the high-pressure section 9 of a two-casing turbine, wherein it expands while giving up energy, and passes hereupon through a connecting pipe $9^2$ into the low-pressure section $9^1$ of the turbine where it further expands. The energy produced in the turbine 9, $9^1$ serves to drive the compressor 1, 2. A possible excess of energy produced in the turbine 9, $9^1$ can be transferred to a machine $9^7$ designed as a motor-generator which can supply any supplementary energy which may possibly be required to drive the compressor 1, 2 and if need be, may serve as a booster for the machine group 1, 2 and 9, $9^1$ when starting up. A portion of the quantity of air drawn in by the compressor 1, 2 and expanded in the high-pressure section $9^1$ of the turbine is branched off at the point $9^3$ of the connecting pipe $9^2$ and passes by way of a heating system 10, which is likewise arranged within the heater 6 and in which external heat is supplied indirectly to said air portion, into the blast furnace 4. The greater part of the remaining portion of the quantity of air drawn in, which traverses the whole of the turbine 9, $9^1$, passes through a pipe 11 to the burner 7 of the heater 6 where this air serves as combustion air. Fuel is supplied to the burner 7 through a pipe 8. Thus a portion of the quantity of air drawn in by the compressor 1, 2 is branched off in any case not later than before the last stage of the low-pressure section $9^1$ of the turbine and passed into the blast furnace 4, while the greater part of the remaining portion of said quantity of air after passing through both turbine sections 9, $9^1$ flows as combustion air to the burner 7 of the heater 6. In the embodiment shown in this Fig. 1 the expansion of the quantity of air which remains after the air required in the blast furnace 4 has been branched off at the point $9^3$, takes place in a separate turbine, i. e. in the low-pressure section $9^1$. Furthermore, the supply of all external heat takes place in a sole heater 6, and the compression of all the air required for consumption purposes and for driving the plant takes place in a common two-casing compressor 1, 2. By means of a valve $3^2$ inserted in the pipe $3^3$ for supplying cooling water to the intermediate cooler 3, the degree of intermediate cooling may be influenced when the quantity of air required by the blast furnace 4 varies, in such a manner that the compression takes place either isothermically or adiabatically to a greater or lesser degree. By means of a valve $9^4$ inserted in the connecting pipe $9^2$ the quantity of air expanded in the low-pressure turbine $9^1$ can be varied when the quantity of air required for consumption varies, and by means of a valve $8^1$ inserted in the fuel supply pipe 8 the degree of heat supplied to the air passing into the high-pressure section 9 and into the low-pressure section of the turbine may be varied when the quantity of said air required for consumption varies. An adaptation of the power taken up by the compressor 1, 2 and of the energy produced by the turbine 9, $9^1$ to the quantity of air required for consumption in the blast furnace 4 or to the pressure up to which the air has to be compressed, may also be attained by providing for a varying quantity of air to by-pass either the high-pressure section 2 of the compressor or the low-pressure turbine $9^1$ or even both these two machines. For this purpose a pipe section $3^4$ is employed which connects the pipe $3^1$ provided between the two casings of the compressor 1, 2 with the delivery pipe $2^1$ of the high-pressure section 2 of the compressor, a valve $3^5$ being inserted in said pipe section $3^4$. Moreover, for the same purpose a pipe section $9^5$ is provided which connects the pipe $9^2$ arranged between the two casings 9, $9^1$ of the turbine with the exhaust pipe 11 of the low-pressure section $9^1$ of the turbine and in which a valve $9^6$ is inserted. Finally, when the quantity of air required for consumption varies or the pressure of the compressed air has to be varied, the speed of the machine groups 1, 2 and 9, $9^1$ can also be varied. Of the hereinbefore mentioned different steps to be taken when the air required for consumption varies or the pressure of the compressed air has to be varied, several or all of them may be adopted at the same time.

Under certain circumstances it may be of advantage to branch off a portion of expanded air passing from the low-pressure section $9^1$ of the turbine into the pipe 11 at a point of the latter and to introduce this portion into a preheater $8^2$ for the fuel passing through the pipe 8 into the burner 7. A portion of the expanded air which has passed into the pipe 11 may also be introduced through a pipe $11^1$ into a heat exchanger $11^2$ in which is preheated the compressed air which passes from the high-pressure section 2 of the compressor through the pipe $2^1$ into the heating system 5.

The illustrated embodiment of the invention is a plant for heating the consumption air supplied to the blast furnace 4 and for heating the motive air supplied to the turbines 9, 9', which drive the compressor 1, 2. A useful feature of the arrangement is that the air for each of the two stated purposes is heated in a single heater 6.

The quantity of exhaust air flowing from the turbine to the burners and used for combustion purposes can be and desirably is at least twice the quantity of air required for complete combustion in the heater 6.

A plant to supply blast air to a blast furnace must be capable of operating economically under normal conditions of operation and must also be capable of furnishing air at higher pressure, say twice the normal pressure, under abnormal conditions which occur only seldom, for example, conditions occasioned by hanging of the charge. The illustrated plant can be operated so as to meet such requirements, as will now be explained.

Turbines and turbo-compressors develop good efficiency only at normal speeds and in any plant of the type illustrated, a serious problem is presented when the plant must furnish blast air at a higher than normal pressure. The illustrated plant can be operated under normal conditions with the valve $9^4$ closed and the valve $9^6$ wide open so that the second turbine 9' is completely by-passed. As a consequence, the air supplied through the pipe 11 to the heater $8^2$ and, as combustion air to the burner 7, is relatively hot because it has not been expanded through the second turbine 9'. For this reason the valve 8' which controls the delivery of fuel to the burner would be about half closed. If a condition should arise in the blast furnace 4 requiring a higher blast pressure, the valve $9^4$ would be opened and the valve $9^6$ would be closed. At the same time the fuel valve 8' would be opened more widely, to compensate for the fact that the air supplied through the pipe 11 has been expanded through the second turbine and consequently brings less heat to the burner.

The effects of these adjustments are numerous and are inter-related. The pressure at the point $9^3$ rises so that the blast pressure increases which, of course, is the primary effect sought. In addition the speed of the machine set 1, 2, 9, 9', $9^7$ increases so that the compressors 1, 2 deliver at increased pressure.

It will be observed that the opening of the valve 8' increases the amount of combustion gas to be burned in the burner 7 but this circumstance imposes no difficulty despite the fact that a larger proportion of the air tapped off at $9^3$ flows to the blast furnace. The reason for this is that, as stated above, the system operates normally with an excess quantity of combustion air, i. e. at least twice the quantity required, so that even when the amount of gas burned is increased, the combustion air is more than ample.

It will be observed that the effects produced by the valves $9^4$, $9^6$ and 8' are closely related and affect not merely the flow path through the second turbine but also the total combustion fuel supplied to the system and the supply of heat through the combustion air and through the fuel pre-heater to the system.

The invention thus affords a flexible turbine-driven system which can be designed to operate at its maximum efficiency under normal conditions with the second turbine 9' cut out. It also will operate with acceptable efficiency at high speed under abnormal conditions with the second turbine 9' included in the circuit. Its inclusion reduces the temperature of the combustion air and reduces the quantity of combustion air, but not below a safe minimum. In addition, the valve $3^5$ and the valve $3^2$, which control the inter-cooler, permit regulation of the performance of the second compressor 2 should that be necessary as a consequence of changed operating conditions and the changed speed of operation of the machine units as above mentioned.

The design of such components as the compressors, the heater for the combustion air and the driving air may be varied to a considerable extent. It is pertinent to remark that the expression "combustion air" is used in a generic sense to include both primary air and secondary air which may be supplied to the heater. It should be observed that the increased back pressure developed when the second turbine 9' is cut into the circuit can be used as the effective means for increasing the pressure on the consumption air. Thus, the valves $9^4$ and $9^6$ have two important functions. They control the speed of the machine set to establish two different conditions and they control the pressure under which the increased quantity of air is delivered to the consuming furnace.

What is claimed is:

1. A plant for the production of compressed air, comprising in combination, staged turbo-compressor means arranged to compress air to a pressure higher than that at which it is to be used; a combustion heating means arranged to supply heat to air so compressed, said heating means being of a type in which products of combustion are segregated from the heated air; means for varying the quantity of fuel supplied to said heating means; a preheater for heating said fuel; two turbines in which air so heated is expanded while giving up energy, said turbines being connected to drive the compressor means; a flow connection leading from the first to the second turbine; an exhaust connection for said second turbine arranged to deliver both combustion air to said heating means and heated air to said preheater; a by-pass branched off said flow connection and leading into said exhaust connection; a shut-off device in said by-pass controlling the passage of air therethrough; a second shut-off device in said flow connection controlling the supply of air to said second turbine; and a discharge connection for a part of said air, leading from a point in said flow connection between the outlet of said first turbine and said two shut-off devices, to a point of use.

2. The combination defined in claim 1 including a by-pass leading around stages of the turbo-compressor means; and means serving to control flow through said by-pass.

3. The combination defined in claim 1 including an intercooler interposed between compression stages; a by-pass leading around a portion of the stages of said turbo-compressor means and around said intercooler; and means for controlling flow through said by-pass.

4. A plant for the production of compressed air, comprising in combination, staged turbo-compressor means arranged to compress air to a pressure higher than that at which it is to be used; combustion heating means arranged to supply heat to the air so compressed, said heating means being of a type in which products of combustion are segregated from the heated air; means for varying the quantity of fuel supplied to said heating means; two turbines in which air so heated is expanded while giving up energy, said turbines being connected to drive said compressor means; a flow connection leading from the exhaust of the first to the inlet of the second turbine; an exhaust connection leading from the exhaust of the second turbine to the burner for delivering combustion air to the latter; valve means operable to close the inlet to the second turbine and connect said flow connection with said exhaust connection; and a discharge connection for a part of said air leading from a point in said flow connection between the exhaust of the first turbine and said valve means.

CURT KELLER.

REFERENCES CITED

The following references are of record in the file of this patent:

UNITED STATES PATENTS

| Number | Name | Date |
|---|---|---|
| 1,702,264 | Lorenzen | Feb. 19, 1929 |
| 2,098,803 | Harris | Nov. 9, 1937 |
| 2,159,849 | Graemiger | May 23, 1939 |
| 2,163,762 | Noack | June 27, 1939 |
| 2,305,785 | Jendrassik | Dec. 22, 1942 |
| 2,354,213 | Jendrassik | July 25, 1944 |
| 2,379,452 | Nettle | July 3, 1945 |
| 2,457,594 | Nettel et al. | Dec. 28, 1948 |

FOREIGN PATENTS

| Number | Country | Date |
|---|---|---|
| 292,292 | Great Britain | June 21, 1928 |
| 601,964 | France | Mar. 10, 1926 |